US006913726B2

(12) United States Patent
Brum

(10) Patent No.: US 6,913,726 B2
(45) Date of Patent: Jul. 5, 2005

(54) METHOD FOR MOLDING AND STRIPPING GOLF BALL CORES FROM A THREE PLATE MOLD

(75) Inventor: William Brum, Raynham, MA (US)

(73) Assignee: Acushnet Company, Fairhaven, MA (US)

(*) Notice: Subject to any disclaimer, the term of this patent is extended or adjusted under 35 U.S.C. 154(b) by 437 days.

(21) Appl. No.: 10/293,801

(22) Filed: Nov. 13, 2002

(65) Prior Publication Data

US 2003/0067093 A1 Apr. 10, 2003

Related U.S. Application Data

(60) Division of application No. 10/011,830, filed on Dec. 4, 2001, now Pat. No. 6,575,728, which is a continuation-in-part of application No. 09/973,344, filed on Oct. 9, 2001.

(51) Int. Cl.⁷ .............................................. B29C 43/02
(52) U.S. Cl. ...................... 264/297.5; 264/325; 264/334
(58) Field of Search ............................... 264/275, 279.1, 264/325, 334, 297.5

(56) References Cited

U.S. PATENT DOCUMENTS

| 4,389,365 | A |   | 6/1983  | Kudriavetz ................. 264/297 |
|-----------|----|---|---------|-------------------------------------|
| 6,303,065 | B1 | * | 10/2001 | Reid et al. .................. 264/248 |
| 6,436,327 | B1 | * | 8/2002  | Cloutier et al. ............. 264/248 |
| 6,439,873 | B1 | * | 8/2002  | Marshall ..................... 425/116 |
| 6,468,381 | B1 | * | 10/2002 | Morgan ................. 156/244.19 |

* cited by examiner

*Primary Examiner*—Edmund H. Lee
(74) *Attorney, Agent, or Firm*—D. Michael Burns

(57) ABSTRACT

An improvement in the method of molding is disclosed which utilizes a three plate mold to form golf ball cores having dual parting lines. A method of stripping the cores from the mold and the flashing is also disclosed.

6 Claims, 4 Drawing Sheets

US 6,913,726 B2

METHOD FOR MOLDING AND STRIPPING GOLF BALL CORES FROM A THREE PLATE MOLD

CROSS REFERENCE TO RELATED APPLICATIONS

This application is a divisional of U.S. application Ser. No. 10/111,830 which was filed Dec. 4, 2001, now U.S. Pat. No. 6,575,728, which is a continuation-in-part of U.S. patent application Ser. No. 09/973,344 which was filed on Oct. 9, 2001 and is incorporated herein in its entirety by express reference thereto.

FIELD OF THE INVENTION

The present invention relates to the molding and stripping of golf ball cores from compression mold plates and in particular three mold plates to produce golf ball cores with dual parting lines.

BACKGROUND OF THE INVENTION

Rubber balls are frequently molded by compression. In compression molding there are usually two mold plates, bottom and top, each of which has a plurality of insert cavities of hemispherical dimension. The composition to be molded is distributed in cylindrical slugs to the bottom mold cavities. Usually the bottom mold plates have cavities that are truncated spheres of greater than hemispherical dimension, while the cavities of the top mold plate are truncated spheres of less than hemispherical dimension as seen in U.S. Pat. No. 4,389,365. The molds are generally aligned in rows as in a muffin tin with from 200 to 400 or more being a typical number of molds per press. The cavities of the bottom mold generally have cross-sections at their top section, which are smaller in dimension than the greatest cross-section of the ball. When the mold plates are parted, the balls will all remain in the cavities in the bottom mold plate, where they are subsequently removed by a pop-up pin design coupled with a stripping fixture plate which is manually operated. A consistent problem is that the pins in their normal operation do generate a high force, which often distorts some of the ball cores in their South Pole area. The mold plates are brought together under heat and pressure as a result of which the rubber expands and fills the spherical cavities of the opposed mold plates. Since it is undesirable to have any voids in the balls, there is usually employed a slight excess of material which exits out of the mold during the ball formation into an overflow area. This excess material cures into scrap or "flash." The scrap is typically ground up and reincorporated into future core material without degrading the properties of the cores, and disposing of scrap adds costs to the making of cores. Another factor influences scrap formation during core molding. Typically, the half-molds are fixed within mold frames so that they cannot move during molding. Differential thermal effects and mechanical mismatches of the half-molds can cause dimensional errors within the molds. As a result, the half-molds can be misaligned during molding. This allows excess pre-form material to escape the cavity. This excess material contributes to the undesirable formation of scrap. These errors can also cause the cores to be out of round. Out-of-round cores can form unplayable golf balls. When the mold plates are parted, the balls all remain in the cavities in the bottom mold plate, where they are subsequently removed along with the flashing by action of the pop-up pins that are located in a base of which the bottom mold plate rests upon.

A manually operated stripping plate is generally used to separate the ball cores from the flashing. This is a very labor intensive procedure which assumes that the ball cores will be held by the flashing long enough to have the stripper plate pass underneath to separate ball core from flashing.

The instant invention presents a method and apparatus to address the above problems, particularly as to providing a means for reducing product defects and reducing the amount of excess flash or scrap.

SUMMARY OF THE INVENTION

The present invention is directed towards an improved method for stripping a plurality of golf ball cores from a mold plate and the flashing that engulfs the cores. The instant invention utilizes a three-plate mold with improved positive retention of the cores in the center of the three plates, thereby allowing for efficient handling by an automated or semi-automated ball core removal system. The improvement in handling the ball cores will reduce product defects.

The present invention provides for an improved method of forming ball cores using three mold plates. A top mold plate contains cavity inserts that consist of core geometry above the core equator. A center mold plate contains cavity inserts having geometry below the core equator and is placed in an intermediate position relative to the core equator and the South Pole of the core. Finally, the inserts of a bottom mold plate contain the remaining core geometry to complete the sphere.

The method of removing the cores comprises first, lifting the top plate immediately upon the mold exiting the press, thereby exposing the center plate containing the molded ball cores. Then lifting while simultaneously rotating the center plate to an angle beyond 90° where it is juxtaposed against a stripping fixture plate with the South Pole area of the cores exposed. And finally, pushing out the remaining cores with a low force from behind the center plate wherein the cores are passed through openings of the fixture plate. The flashing remains in the molding fixture for further handling. The plate handling procedure is automated.

The present invention also provides for the production of golf ball cores having dual parting lines. A first parting line being spaced from a first pole (North Pole) by a first distance, and a second parting line being spaced from an opposite second pole (South pole) which of the core by a second distance less than the first distance.

DETAILED DESCRIPTION OF THE INVENTION

The present invention is directed to a method for making golf ball cores. These cores are substantially solid and form a center of a golf ball. To form the balls the cores of the present invention can be painted or surrounded by a singlelayer or multiple-layer cover then painted. These balls may also include intermediate layers of molded or wound material as known by those of ordinary skill in the art. The present invention is therefore not limited to incorporating the cores into any particular golf ball construction and the present cores can be used in any constructions.

Figure 1:
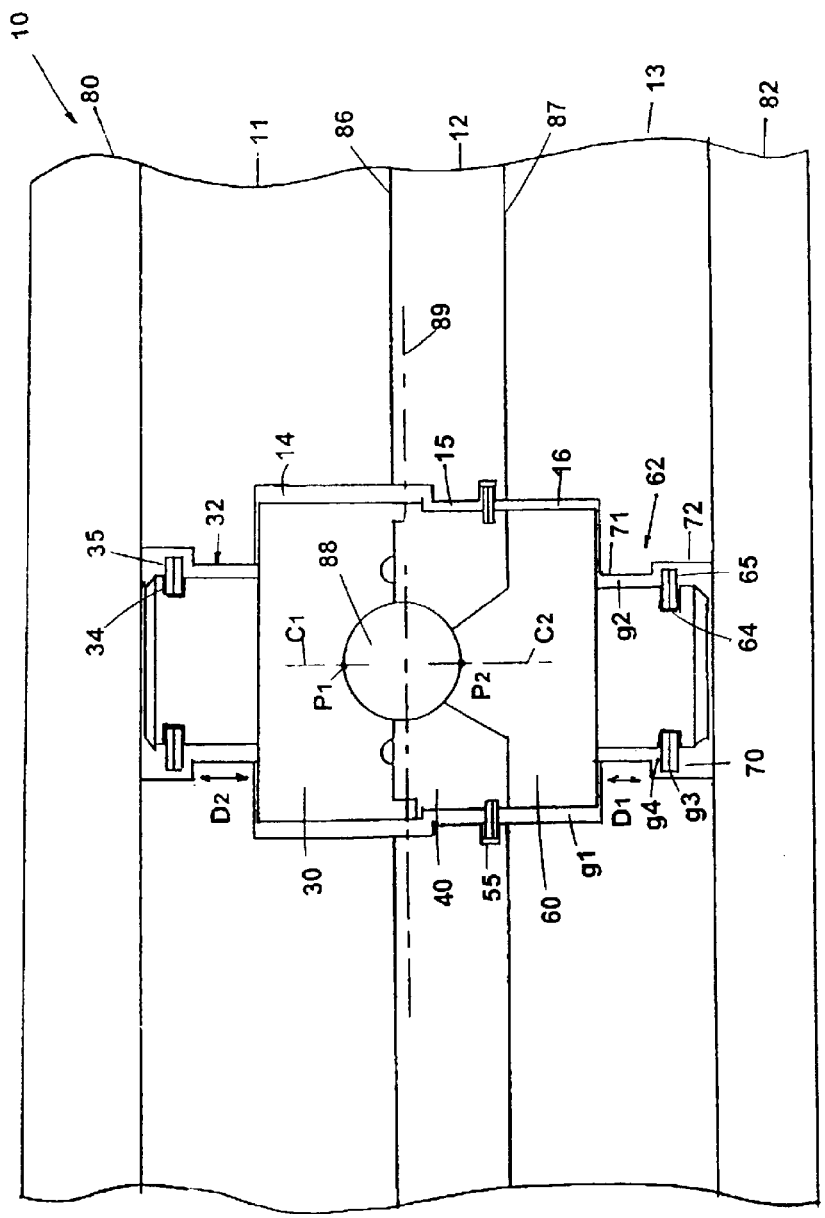
FIG. 1 is a cross-sectional view of the three-plate mold and a ball core formed therein.
Figure 2:
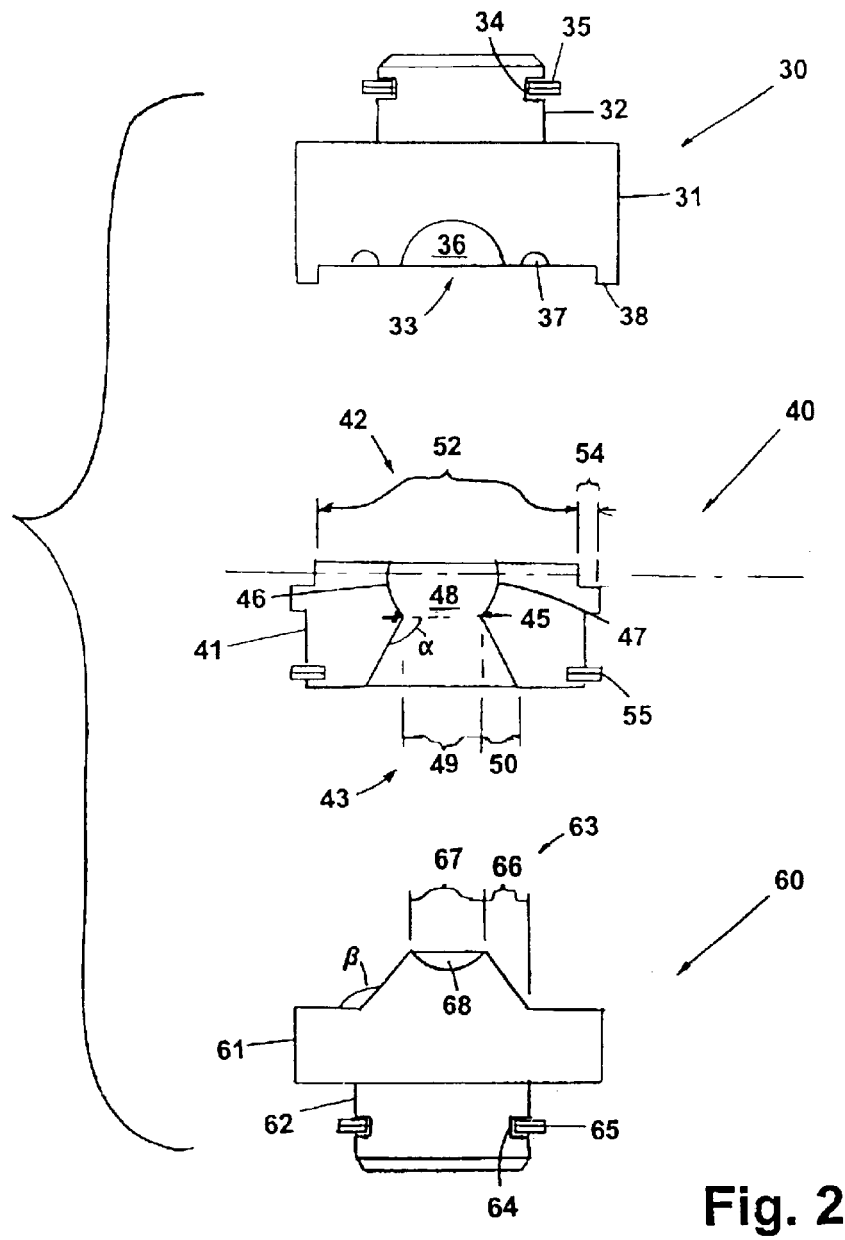
FIG. 2 is a cross-sectional of the three inserts.

Referring to FIGS. 1 and 2, a three-plate mold 10 is shown having a top mold plate 11, a center mold plate 12 and a bottom mold plate 13. Each of the mold plates 11, 12, and 13 define at least one cavity 14, 15, and 16, respectively therein. It will be appreciated that preferably there are a number of cavities in each mold plate 11, 12, and 13 with only one thereof being shown of each in FIG. 1. The cavities of typical mold plates are generally aligned in rows as in a muffin tin.

The cavity 14 in the top mold plate 11 receives a top mold insert 30. The top mold insert 30 includes an exterior surface 31 (best seen in FIG. 2) with an extension 32 extending outwardly therefrom and an opposite interior surface 33. The extension 32 further includes a circumferentially extending groove 34 for receiving a retaining ring 35 therein. The retaining ring 35 is formed separately from the extension 32. In another embodiment, the top mold insert 30 can be pressed-fit into the top cavity 14.

The interior surface 33 is a section within a circumscribed alignment ridge 38 which extend downwardly away from the top mold insert 30, and includes a central-truncated-spherical cavity 36 and an overflow semi-hemispherical channel 37 spaced from and circumscribing the truncated-spherical cavity 36. The cavity 14 includes a central axis C1 extending through a first pole P1 of the cavity 14.

The cavity 15 in the center mold plate 12 receives a center mold insert 40. The center mold insert 40 includes an exterior surface 41 and a pair of opposite interior surfaces, an upper interior surface 42 and a lower interior surface 43. The upper interior surface 42 includes a first portion 52 and a second portion 53. The first portion 52 includes a pair of opposite spherical sections 46 and 47 defining a central-truncated-spherical cavity 48 with a slot 45 defined on the lower segment of the cavity 48. The second portion 53 includes a circumferential recess 54 for receiving the alignment ridge 38. The lower interior surface 43 includes a first portion 49 and a second portion 50. The first portion 49 includes the slot 45 defined therein. The second portion 50 circumscribes and is angularly offset from the first portion 49 by an angle $\alpha$. Preferably, the angle $\alpha$ is between about 105° and about 145° and more preferably the angle $\alpha$ is about 120°. The exterior surface 41 includes a circumferential retaining ring member 54 that is formed separately from the insert 40. The ring member 54 is placed into a friction fit with a circumferential orifice 55 defined in the surface of the center mold plate cavity 15.

The cavity 16 in the bottom mold plate 13 receives a bottom mold insert 60. The bottom mold insert 60 includes an exterior surface 61 with an extension 62 extending outwardly therefrom and an opposite interior surface 63. The extension 62 further includes a circumferentially extending groove 64 for receiving a retaining ring 65 therein. The retaining ring 65 is formed separately from the extension 62. In another embodiment, the bottom mold insert 60 can be pressed-fit into the bottom cavity 16.

The interior surface 63 includes a first portion 67 and a second portion 66. The first portion 67 includes a central-truncated-spherical cavity 68. The cavity 16 includes a central axis C2 extending through a second pole P2 of the cavity 68. The second portion 67 circumscribes and is angularly offset from the first portion 66 by an angle $\beta$. Preferably, the angle $\beta$ is between about 105° and about 145° and more preferably the angle $\beta$ is about 120°. It will be appreciated that preferably there are a number of three mold inserts 30, 40, and 60 in each mold plate 11, 12 and 13 with only one thereof being shown in FIG. 2.

The spherical cavity 48 of the center mold insert 40, when combined with the spherical cavity 68 of the bottom mold insert 60, creates a truncated sphere cavity of preferably greater than hemispherical dimension. And the spherical cavity 36 of the top mold insert 30 is a truncated sphere of preferably less than hemispherical dimension, as disclosed in U.S. Pat. No. 4,389,365, which is incorporated by reference herein in its entirety. This configuration and dimension of the cavity allows cores to be retained in the center mold insert 40 after molding.

Preferably, each of the three mold inserts 30, 40 and 60 are formed as a single piece including the extensions 32 and 62 of mold inserts 30 and 60 respectively, and the cavities 36, 48 and 68 by machined casting. The overflow channel 37 is optional and preferably machined into the mold insert 30. The second portions 50 and 66 of the upper surface of the center and bottom mold inserts 40 and 60 are machined with a precise mating angle within about 0.5%. One preferred material for forming the mold inserts is hardened steel with chrome plating. Alternatively, the mold inserts can be formed of beryllium, copper or aluminum but are not limited to these materials. The retaining rings are preferably formed of commercially available materials such as carbon or stainless steel.

Referring again to FIG. 1, the top, center and bottom mold plates 11–13 each include a bore 70. The bore 70 includes a narrow portion 71 and an enlarged portion 72. Each narrow portion 71 receives the extensions 32 and 62 of the top and bottom mold inserts 30 and 60 respectively. Each enlarged portion 72 receives the retainer rings 35 and 65 of the top and bottom mold inserts 30 and 60 respectively. The retainer rings 35 and 65 and the configuration of the bore 70 and cavities 14, 15 and 16 of the mold plates 11, 12 and 13 allow the three mold inserts 30, 40 and 60 to move vertically in the directions D1 and D2 and the opposites thereof. Preferably, less than about 0.030 inches of vertical movement is allowable and more preferably less than about 0.020 inches of vertical movement is allowable. Alternatively, the mold can be formed so that vertical movement of the mold inserts 30, 40 and 60 is prevented.

The three mold inserts 30, 40 and 60 and the respective cavities 14, 15 and 16 are configured and dimensioned such that a gap g1 is formed there between. The extensions 32 and 62 and the narrow portion 71 of each bore 70 are configured and dimensioned such that a gap g2 is formed there between. The retainer rings 35 and 65 and the enlarged portion 72 of each bore 70 and cavities 14 and 16 of the top and bottom mold plates 11 and 13 are configured and dimensioned such that gaps g3 and g4 are formed.

The mold 10 further includes a top back-up plate 80 adjacent to the top mold plate 11 and a bottom back-up plate 82 adjacent the bottom mold plate 13. The top and bottom back-up plates 80 and 82 are optional. The mold plates 11, 12 and 13 and back-up plates 80 and 82 are preferably formed of steel.

Figure 6:
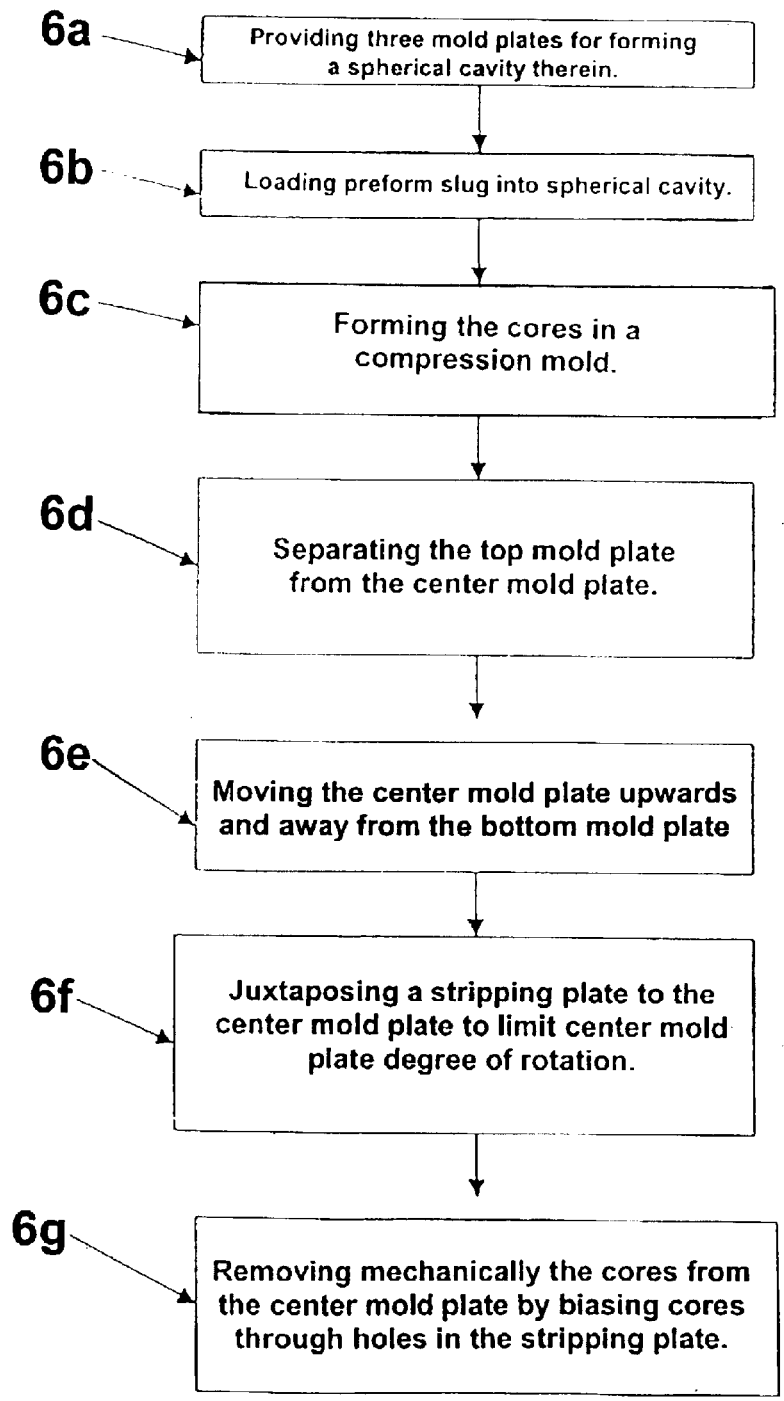
FIG. 6 is a flow chart illustrating a method of making golf ball cores according to the present invention.

Referring to FIGS. 2 and 6, in step 6a the method of the present invention includes providing a three plate mold 10 with at least one set of mold plates 11, 12 and 13 to form a spherical cavity. In step 6b, recall that preferably conforming pre-forms are disposed into the cavity 48 of the center mold insert 40. The set of mold inserts 30, 40 and 60 are advanced toward each other in the directions D1 and D2 or closed using a conventional molding press. The bores 70 of the mold plates 11, 12 and 13 align the mold plates with respect to one another. When the second portions 50 and 66 (as best seen in FIG. 2) of the center and bottom mold inserts 40 and 60 contact each other, the gaps g1, g2 and g3, allow for the three mold inserts 30, 40 and 60 to move (in the directions illustrated by the arrow D3) into alignment with respect to one another. As compared to the closing directions D1 and D2, the mold inserts 30, 40 and 60 move along direction D3, which is angularly offset from the closing directions. More preferably, the mold inserts 30, 40 and 60 move substantially horizontally with respect to one another in the directions illustrated by the arrow D3 into alignment. Thus, during closing the mold inserts 30, 40 and 60 align such that the central axis C1 and central axis C2 are coaxial. When the second portions 50 and 67 of the mold inserts, respectively, contact each other, the gaps g4 allow the mold inserts to move vertically with respect to one another in the directions illustrated by the arrows D1 and D2 or in directions opposite thereto.

Once the mold 10 is completely closed, step 6c of compression molding occurs at a predetermined time, temperature, and pressure to cross-link the pre-form material. For example, compression molding can occur at about 160° C. (320° F.) for about 15 minutes at a cavity pressure of 3000 psi to form the cores. After compression molding, the cores can remain in the molds until the material is completely or partially cured.

Figure 4:
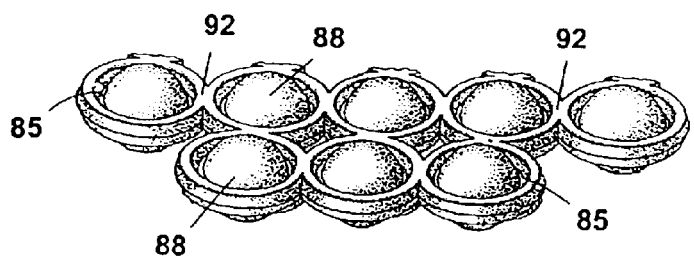
FIG. 4 shows the ball core/flashing complex.

Passing about the top mold insert 30 are semi-hemispherical flash overflow grooves 37 for release of excess ball material that makes up the flashing 85 which is interconnected throughout the mold plates and is shown in FIG. 4 herein. The shape of the grooves is optional, as many various shapes will perform equally as well.

Figure 5:
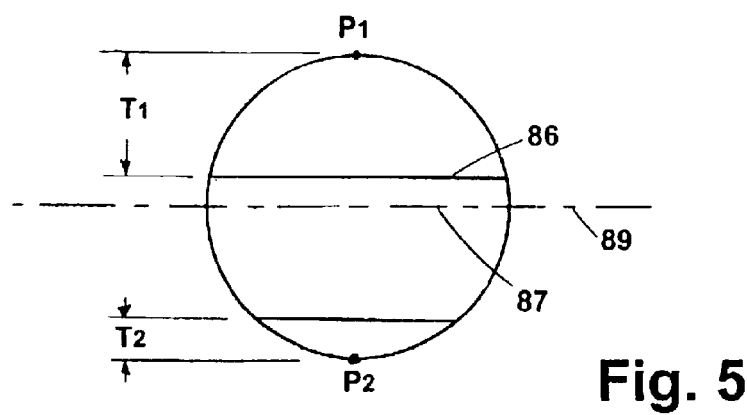
FIG. 5 is a symmetrical view of the parting lines of the core.

The golf ball core 88 has a center line 89, however, for the present invention this is not the mold parting line between the top mold plate 11 and the center mold plate 12. For the present invention a pair of parting lines, an upper parting line 86 and a lower parting line 87, are created as shown in FIGS. 2 and 5. The upper parting line 86 is spaced from the first pole P1 by a first distance T1 and the second parting line is spaced from the second pole P2 by a second distance T2. The second distance T2 being less than the first distance T1. Preferably, the first distance is between about 30 to 49 percent of the length of the diameter of the core and more preferably about 45 percent. Preferably, the second distance is between about 3 to 20 percent of the length of the core diameter and more preferably about 10 percent.

The center and bottom spherical cavities 48 and 68 form a truncated sphere of greater than hemispherical dimensions, while the top spherical cavity 36 is a truncated sphere of less than hemispherical dimension. The cavity formed by the center spherical cavity 48 thus has a cross-section at its top that is smaller in dimension than the greatest cross-section of the ball core 21 as described in U.S. Pat. No. 4,389,365. When the mold plate 11 is parted from the center mold plate 12, the ball cores 88 all remain in the cavity inserts 40 and 60 of the center and bottom mold plates 12 and 13. The ball cores 88 can be removed by activation of the method shown in FIG. 3, to be described in detail below.

The size of the opening of the bottom mold insert 60 is not critical. However, it is preferred that the center mold insert 40 have an opening diameter of at least 0.5% less than the diameter of the widest part of the ball core 88. And preferably, the center mold insert 40 has an insert opening of at least 1% less than the diameter of the widest part of the ball core 88. It is further preferred that the center mold insert 40 not have a diameter at its opening which is greater than 10% less than the diameter of the widest part of the ball core 88. For the range of 0.5%–10% the insert volume ratio will be from about 10:7 to about 5:2 between the center/bottom mold inserts 40, 60, and top insert 30 (not necessarily respectively). The lower limit has been found to yield excellent retention of the ball cores 88 in the center mold plate 12 while diameters above the upper limit frequently result in tearing of the product during removal. Obviously these values will vary depending upon the overall size of the core, the nature of the product being made, the material being molded and its intended use. It is important that the dimension for the upper portion of the mold insert 40 of the center mold plate 12 be small enough in dimension to retain substantially all of the ball cores 88 when the mold plates 11–13 are open. And they should be of large enough dimension so that the ball cores 88 are not destroyed when ejected.

It is well known in the prior art that ball cores have a tendency to stick in both the upper and lower mold plates as a result of which removal is quite difficult. If ejector pins are used for both the upper and lower mold plates, the balls falling from the top have a tendency to bounce around and fall out of the mold where the operator cannot get them easily. Furthermore, the balls will usually have portions of the flash hanging from various parts of the equator of the ball, of which the flash is somewhat difficult to remove. This problem is accentuated when molding relatively small inner cores of about 1 inch or less.

Figure 3:
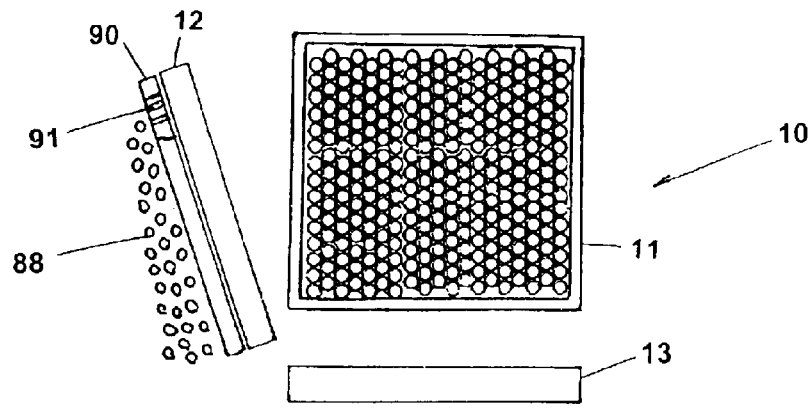
FIG. 3 is a front view showing the relationship of the three plates when the mold is in position for stripping the cores from the mold and flashing.

The creation of a preform slug and its placement into the center mold insert 40 for compression molding into a golf ball core 88 is discussed in the parent application and is part of step 6b of the method previously discussed. FIGS. 3 and 6, further shown the method of making a ball core 88 once the preform has been disposed into the mold insert 40. Steps 6d, 6e, 6f and 6g complete the method of removing the cores 88 from the mold 10 while simultaneously stripping the cores 88 from any excess overflow flashing 92. When the ball cores 88 are sufficiently cured, the three plate mold 10 is removed from the compression machinery, wherein the top mold plate 11 is automatically raised by hydraulic means and turned rearward to an approximately 90° angle relative to the center mold plate 12 as in step 6d. With the formed ball cores 88 disposed within the center cavity mold inserts 40, the center mold plate 12 is lifted automatically by hydraulic means as shown in step 6e. In step 5f while the center mold plate 12 is lifted, it is simultaneously rotated away from the bottom mold plate 13 to a position where it is finally juxtaposed against a fixed stripping plate 90, that is at an angle slightly beyond 90° vertical. The second poles P2 (South Pole) of ball cores 88, the bottom core inserts 60 are thereby exposed. The fixed stripping plate 90 has a plurality of holes 91 corresponding to the position of the ball cores 88 in the center mold plate 12. Holes 91 are preferably made slightly larger (up to about 10% greater diameter is suitable) than the diameter of the ball cores 88. As the ball cores 88 drop through the holes 91 in the stripping plate 90, they come out substantially free of overflow flash 82. In step 6g once the center mold plate 12 is in raised position, the ball cores 88 need only to be tapped to separate them from the overflow flashing 92. The balls cores 88 will fall through the holes 91 of the stripping plate 90 wherein the overflow flashing 92, which is interconnected throughout the center core plate 12, will be trapped between the two plates 12 and 90. The overflow flashing 92 can be therein removed for recycling. This procedure can be automated, but as suggested above, can also be accomplished manually.

Although the present invention is primarily concerned with spherical objects, such as golf balls, it will be appreciated that it can also be used with other objects, especially those with a smooth surface such as: egg shaped products, and cylindrical products wherein the parting line is along the length.

It will be understood that the claims are intended to cover all changes and modifications of the preferred embodiments of the invention, herein chosen for the purpose of illustration, which do not constitute a departure from the spirit and scope of the invention.

I claim:

1. A method of making golf ball cores including the steps of:
   (a) provding three mold plates, including a top mold plate, a center mold plate, and a bottom mold plate, each mold plate having at least two mold inserts therein wherein each mold insert forms a portion of a spherical cavity in the shape of the core, the mold plates being movable towards and away from each other and, when together, the cavity of each mold insert being in registration with the corresponding cavity of the other inserts to collectively define the spherical cavity;
   (b) loading a preform slug into each mold insert of the center plate;
   (c) compression molding the loaded preform slug by bringing together the mold plates to form a plurality of the golf ball cores;
   (d) separating the top mold plate from the center mold plate, the center mold plate retaining the plurality of golf ball cores therein;
   (e) moving the center mold plate away from the bottom mold plate; and
   (f) stripping the cores from the center mold plate.

2. The method of making golf ball cores according to claim 1, wherein the stripping of the cores includes:
   juxtaposing a fixed stripping plate with the center mold plate to limit the degree of rotation of the center mold plate, the fixed stripping plate having a plurality of holes corresponding to the arrangement of the golf ball cores in the center mold plate; and
   removing mechanically the cores from the center mold plate by biasing the cores through the plurality of holes of the stripping plate.

3. The method according to claim 2, wherein the angle at which the center mold plate is juxtaposed against the stripping plate is greater than 90 degrees relative to the bottom mold plate.

4. The method according to claim 1, wherein each golf ball core comprises a substantially spherical component having:
   a first parting line and a second parting line;
   the first parting line being spaced from a first pole of the spherical component by a first distance; and
   the second parting line being spaced from an opposite pole by a second distance which is less than the first distance.

5. The method according to claim 4, wherein the first distance is between about 30 to 49 percent of the diameter of the core.

6. The method according to claim 4, wherein the second distance is between about 3 to 20 percent of the diameter of the core.

* * * * *